May 26, 1964 L. E. SODERQUIST 3,134,136
TIRE CARCASS LOADING APPARATUS FOR TIRE CURING PRESS
Filed Nov. 9, 1959 4 Sheets-Sheet 1

INVENTOR.
LESLIE E. SODERQUIST
BY
ATTORNEYS

May 26, 1964 L. E. SODERQUIST 3,134,136
TIRE CARCASS LOADING APPARATUS FOR TIRE CURING PRESS
Filed Nov. 9, 1959 4 Sheets-Sheet 2
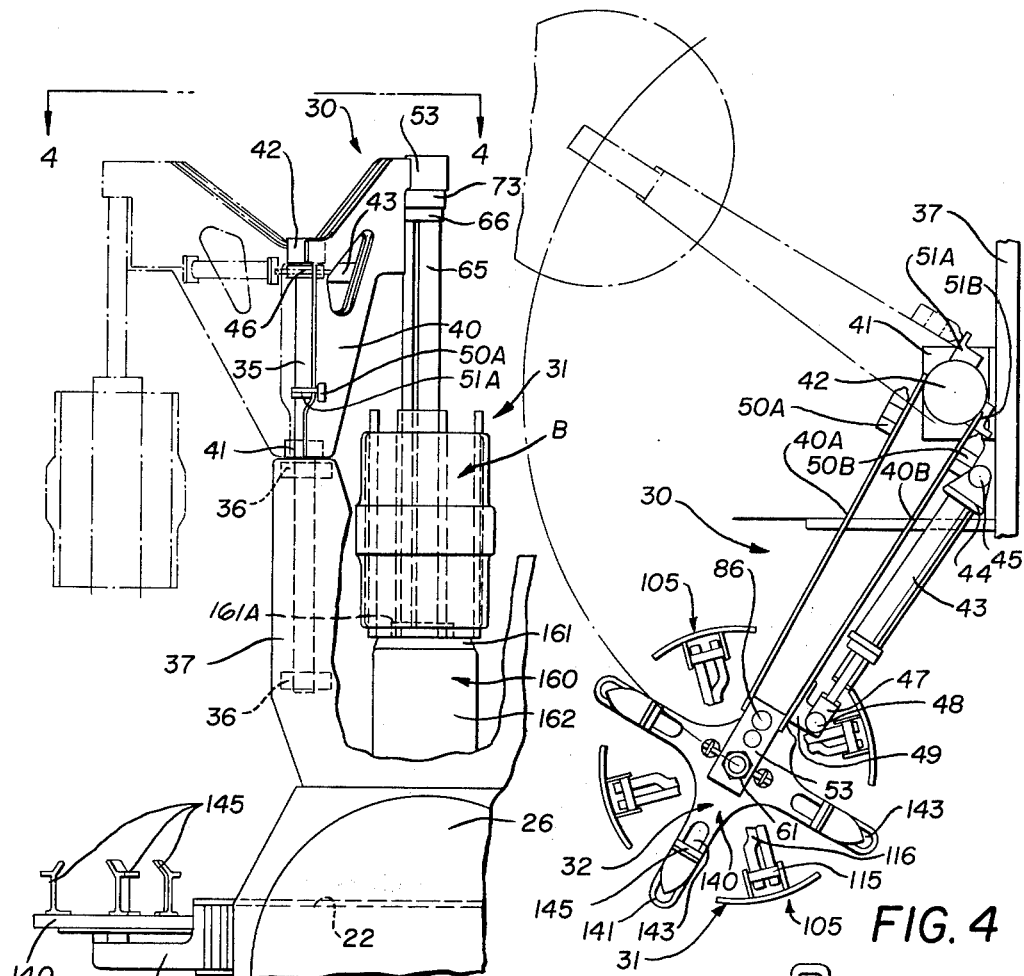
FIG. 3
FIG. 4
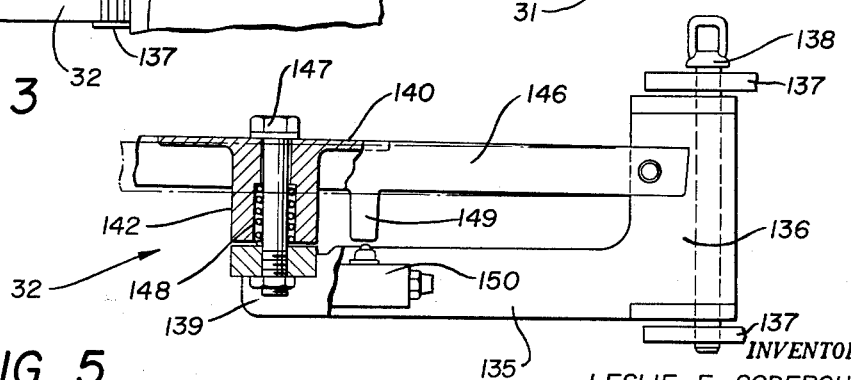
FIG. 5
INVENTOR.
LESLIE E. SODERQUIST
BY Ely, Frye & Hamilton
ATTORNEYS

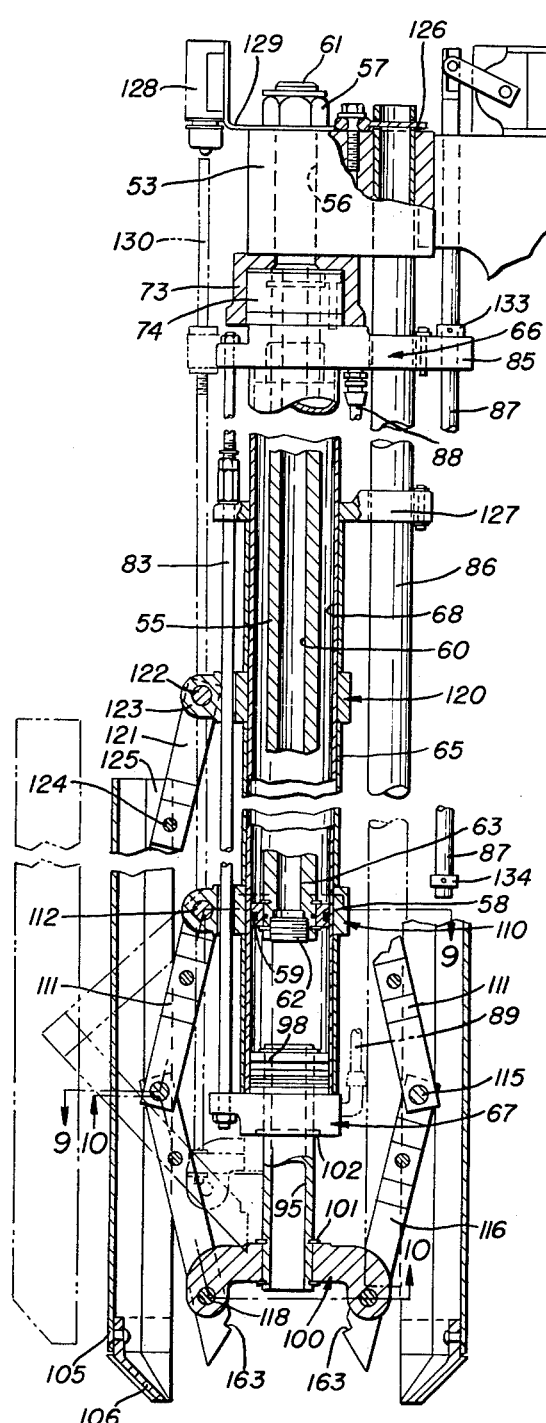
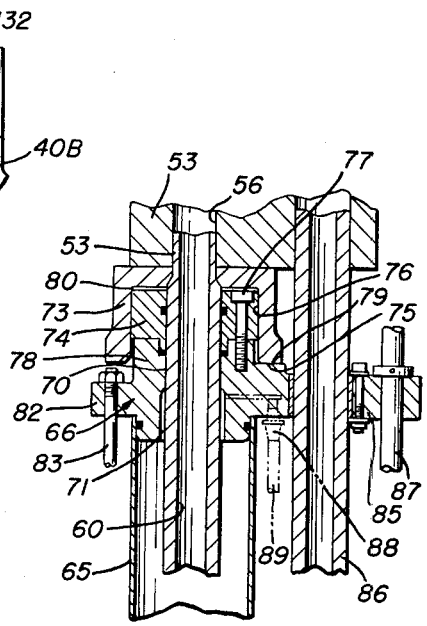
FIG. 7
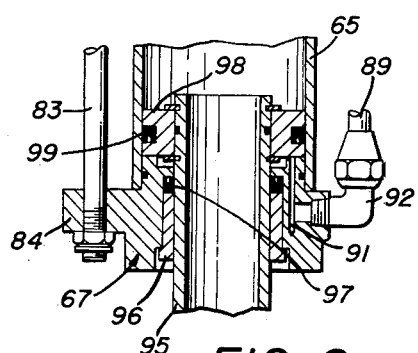
FIG. 8
FIG. 6
INVENTOR.
LESLIE E. SODERQUIST
BY Ely, Fryer Hamilton
ATTORNEYS

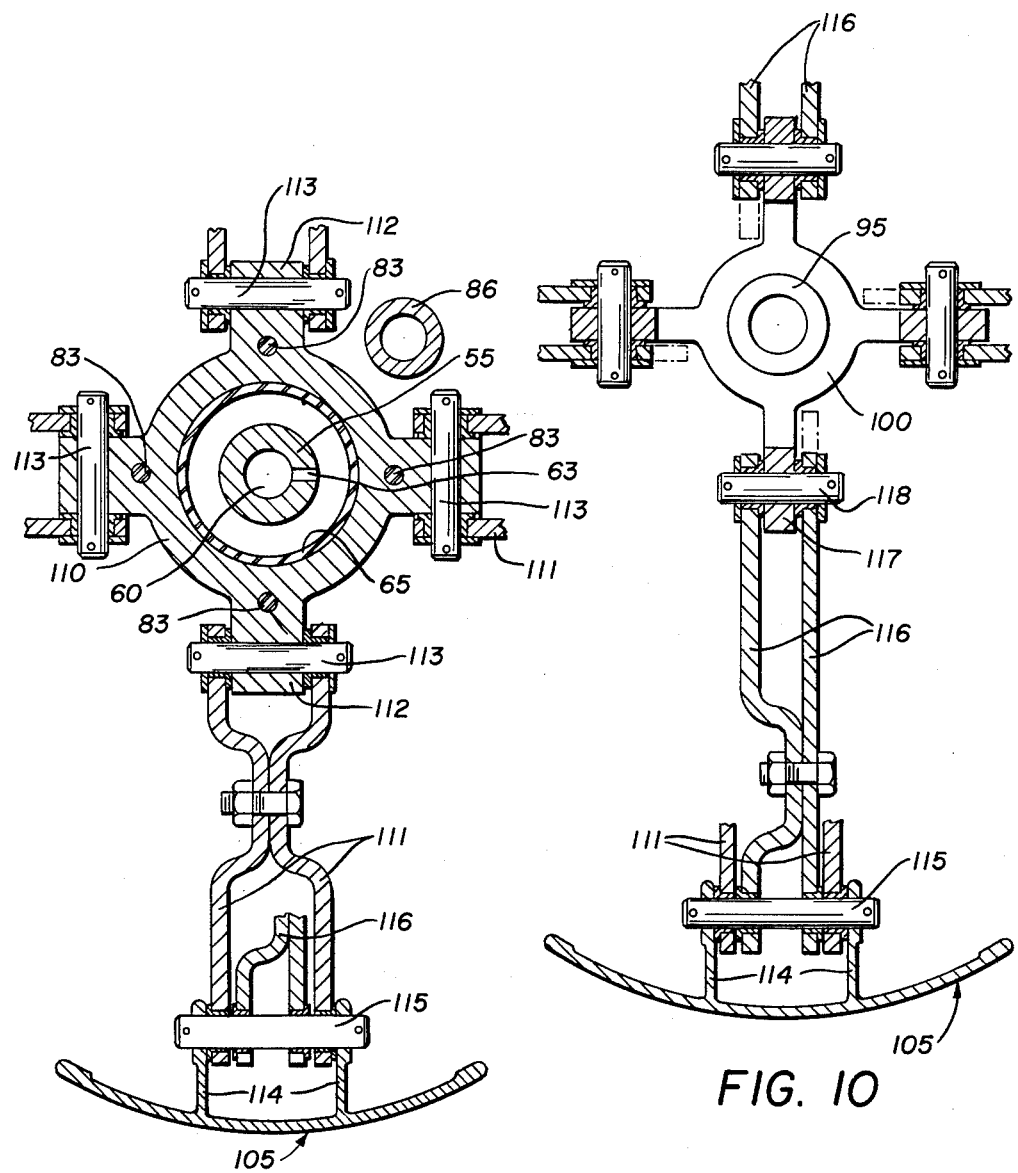

United States Patent Office 3,134,136
Patented May 26, 1964

3,134,136
TIRE CARCASS LOADING APPARATUS FOR
TIRE CURING PRESS
Leslie E. Soderquist, Silver Lake, Ohio, assignor to The
McNeil Machine & Engineering Company, Akron,
Ohio, a corporation of Ohio
Filed Nov. 9, 1959, Ser. No. 851,859
6 Claims. (Cl. 18—2)

The present invention relates to improvements in tire presses for shaping and curing unvulcanized tire bands within separable mold sections. More particularly, the invention relates to improvements in the loading and positioning of uncured tire bands in a press having separable upper and lower mold sections which when open are adapted to receive an uncured band in registry with a mold section. The invention specifically relates to a tire press having a mechanism for loading and positioning uncured tire bands, which mechanism includes a movable boom extending above the mold sections, a reciprocating mandrel carried by the boom for manipulation of an uncured tire band, and a platform at the front of the press for supporting an uncured tire band prior to engagement by the mandrel.

The press loading mechanisms of the invention are intended to improve the operation of presses adapted and constructed for shaping and curing tires in an automatic manner or fashion. The loading mechanisms may be factory installed as original equipment but are also well suited for field installation on existing presses. The loading mechanism disclosed herein promotes the progress of the arts of tire manufacture in that uncured tire bands, built in locations remote from the tire presses and delivered by conveyors, lift trucks, etc., are loaded and positioned in a press ready for curing without deformation or distortion.

It is therefore an object of the invention to improve the operation of loading a press for the shaping and curing of unvulcanized tire bands.

It is a further object of the invention to provide a loading mechanism which is relatively low in cost, inexpensive to maintain, and adaptable for installation on new or existing presses.

It is a further object of the invention to provide a loading mechanism which will position an unvulcanized tire band in alignment with and in contact with the uppermost element of the band forming mechanism, shaping mechanism, etc. when the press is open.

Still further, it is an object to provide a loading mechanism including an improved concept of construction for the mandrel or band engaging means.

These and other objects of the invention, as well as the advantages thereof, will be apparent in view of the following detailed description when taken in conjunction with the attached drawings.

In the drawings:

FIG. 3 is an additional side view, similar to FIG. 2, but showing the mandrel in the position aligned axially with a lower mold section and above the forming mechanism;

FIG. 4 is an enlarged top view (taken substantially as indicated by lines 4—4 in FIG. 3 except that the position over the lower mold is in the chain lines), showing the loading mandrel in the "front" position;

FIG. 5 is a view of the platform, partly in section and partly in elevation, which supports the unvulcanized tire bands prior to loading by the mandrel;

FIG. 6 is a detail view of the mandrel, partly in section and partly in elevation, with the contracted condition being shown in full lines, and the expanded condition be shown in chain lines;

FIG. 7 is an enlarged fragmentary section taken through the upper portion of the mandrel;

FIG. 8 is a view similar to FIG. 7, but taken through the lower portion of the mandrel;

FIG. 9 is a further enlarged plan section through the mandrel, taken substantially as indicated on line 9—9 of FIG. 6; and FIG. 10 is a view similar to FIG. 9, but taken substantially on line 10—10 of FIG. 6.

GENERAL DESCRIPTION

Figure 1:
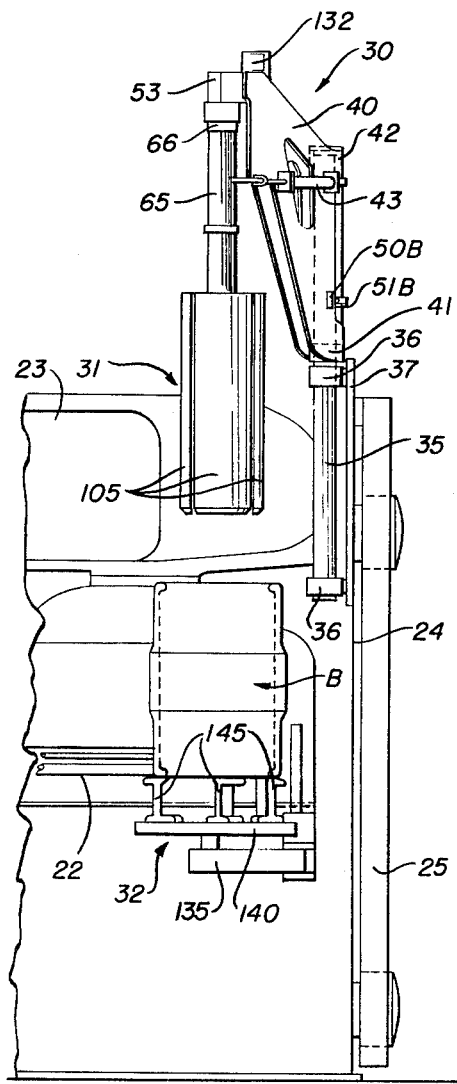
FIG. 1 is a fragmentary front elevation of a tire curing press embodying the invention, with the loading mandrel in the "up" or raised position and in the contracted condition.
Figure 2:
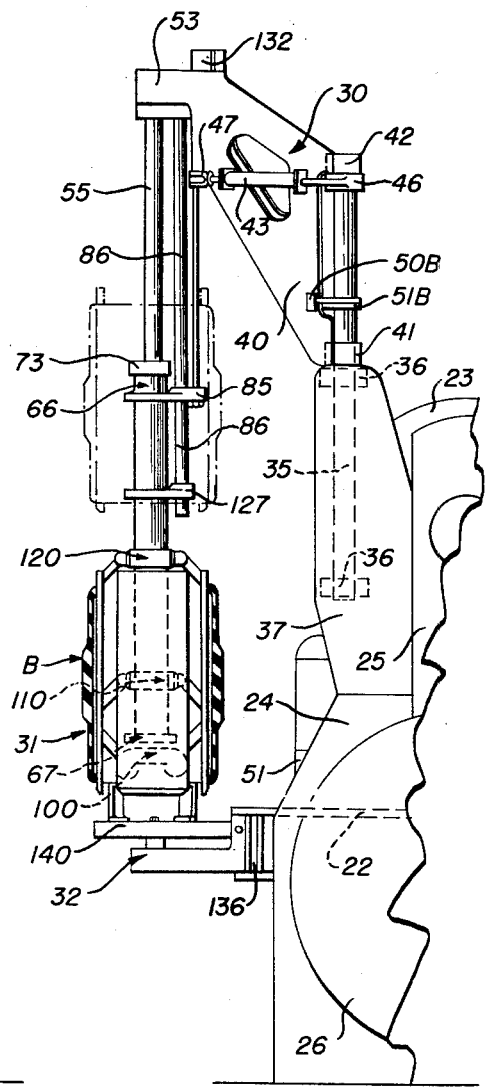
FIG. 2 is a fragmentary right side elevation of the press of FIG. 1, with the loading mandrel in the "down" or lowered position and in the expanded condition engaging an uncured tire band.

The tire curing presses of the invention, as best shown in FIGS. 1, 2, and 3, have a general construction and operating mechanism as shown in a number of prior art patents and of applications of the inventor, including United States Patent No. 2,808,618 to which reference is made for such details of what is now well know press construction as are required to more fully understand the invention. These presses are constructed so that it is possible to obtain a maximum "tilt-back" of the upper mold section 20 and clearance above the lower mold section 21. This type of press is preferred, but it will be apparent that presses of other types and designs could be used in the practice of the invention so long as an uncured band can be registered with a lower mold section when the press is open.

The concepts of the invention may also be embodied in a "bagless cure" press, such as the types shown in the inventor's U.S. Patents Nos. 2,812,544; 2,812,545; or 2,812,546. However, as described in detail below the invention contemplates the provisions of means integrally combined with the press for removal and change of an inflatable bag or diaphragm type forming mechanism, such as the type shown in Patent No. 2,808,618, referred to above.

Referring to the drawings, the lower or stationary mold sections 21 are carried on a base 22. The movable upper mold sections are supported from a cross head 23. On opposite sides of the lower mold sections 21 are guide plates 24 extending upwardly from the base 22. At each end of the cross head 23 are suitable guiding arms (not shown) having roller means engaged in parallel front and rear vertical guideways (also, not shown) in the guide plate 24. The cross head 23 is pivoted to the upper end of a pair of operating links 25 on opposite sides of the press and outside of the guide plates 24. The links 25 are actuated by large motor driven bull gears 26 to raise the cross head and open the press.

A loading mechanism according to the invention for positioning uncured tire bands between the mold sections of a press includes a boom indicated generally at 30, a reciprocating mandrel indicated generally at 31 and carried by the boom 30, and a platform indicated generally at 32 supporting an uncured tire band B prior to positioning by the mandrel 31.

The Loading Boom

In the preferred form of the invention, each loading boom 30 is a component of a mechanism for serving one mold, comprising an upper and a lower mold section. Thus, in a dual press, it is preferred that there be one boom 30 at either side of the press. However, the concepts of the invention could be employed with equal facility for tire presses having only one or more than two sets of separable mold sections. In the latter use, suitable structural elements could be employed to mount a boom 30 so that one mandrel 31 could service more than one mold.

As shown in FIGS. 1–4, each boom 30 includes a vertical mast 35. The lower end of a mast 35 is supported by suitable clamp brackets 36 spaced one above the other and attached to a mounting plate 37 secured to the press guide plate 24. The upper end of a mast 35 extends above the guide plate 24 and rotatably mounts a wing-shaped arm 40. The boom arm 40 extends upwardly and outwardly from mast 35 and is rotatably mounted thereon by a lower collar 41, which bears on the upper bracket 36, and an upper or cap collar 42 which covers the upper end of the mast 35.

As best shown in FIG. 4, the laterally extending boom arm 40 comprises two similarly shaped plates 40A and 40B. The arm preferably has the double plates for purpose of increased rigidity and cantilever strength. The rigid boom arm 40 is rotated, for purposes described below, by a suitable pneumatic cylinder 43. The base end of cylinder 43 has a flange 44 which is pivotally attached, as by a pin 45, to a bracket 46 clamped on mast 35 below the cap collar 42 (see FIG. 3). The rod end of cylinder 43 terminates in a clevis 47 which is pivotally attached, as by a pin 48, to a bracket 49 attached to the radially outer portion of the arm plate 40B.

Referring still to FIG. 4, on the radially inner portion of each arm plate, 40A and 40B, are mounted electrical switches, 50A and 50B. Each switch 50 is preferably of the snap action type having a button plunger which is actuated upon contact with their respective switch plates, 51A and 51B. As further described below, switch 50A controls the loading mechanism with the boom 30 and mandrel 31 in the position aligned axially with a lower mold section 21 and above the forming mechanism. Switch 50B controls the loading mechanism with the boom 30 and mandrel 31 in the position above the loading platform 32.

*The Loading Mandrel*

The loading mandrel 31, which could also be termed an expansible chuck, a band holding means or a transfer device, depends from a boom collar 53 securely attached to the upper and radially outer end of the boom arm 40. The mandrel 31, as shown in FIGS. 6–10, is characterized by the fact that it is raised to the "up" position by the force of pressure fluid introduced interiorly of the mandrel. The mandrel is lowered to the "down" position by the force of gravity and the controlled release of the pressure fluid which had raised the mandrel.

The primary axial component of mandrel 31 is a long cylindrical shaft 55. The upper end of shaft 55 is inserted through a vertical bore 56 in the boom collar 53 and is attached thereto as by a bolt 57. The lower end of shaft 55 carries a flange-like fixed piston 58 having suitable peripheral sealing means such as the O-ring indicated at 59. The length of shaft 55 and the position of piston 58 thereon establishes the range of vertical travel of the mandrel 31 during loading and positioning operations.

Pneumatic pressure fluid, such as compressed air from a suitable source (not shown), is introduced into the upper end of the axial shaft bore 60 through a reducing bushing 61 fitted within the bolt 57 atop the boom collar 53. The lower end of the shaft bore 60 is closed by a threaded plug 62. The pressure fluid passes out of the bore 60 at the lower end of the shaft 55, and a slight distance above the fixed piston 58, through a passage 63.

The primary movable component of the mandrel 31 is a long cylinder 65 located coaxially around the shaft 55. The cylinder 65 reciprocates, or moves up and down upon the vertical axis defined by the shaft 55, in response to pressure fluid introduced into the upper end of shaft bore 60 and reacting against the fixed piston 58. The upper end of cylinder 65 is sealed by a closure member indicated generally at 66. The lower end of cylinder 65 is sealed by a closure member indicated generally at 67. Between the ends, the surface of bore 68 of the cylinder 65 is engaged by the fixed piston 58 and the peripheral sealing means 59.

Referring to FIG. 7, the upper closure 66 has an axial bore with a bushing portion 70 slidably receiving the axial shaft 55. Below the bushing portion 70, the lower end of the closure bore is slightly relieved to provide an increased diameter portion 71. The height (or length) of relieved portion 71 is just slightly greater than the distance between the upper surface of the fixed shaft piston 58 and the upper edge of the pressure fluid passage 63 (see FIG. 6). When the mandrel 31 is in the lower or "down" position (FIG. 2), pressure fluid introduced into shaft bore 60 and out passage 63 will enter into relieved portion 71 and impinge on the closure 66, against the resistance of fixed piston 58, to lift the cylinder 65 upwardly along the shaft 55.

Referring still to FIG. 7, when the cylinder 65 is raised the upward motion is stopped by a bumper cap 73 and a bumper block 74 attached to the upper surface of the closure member 66. The cap 73 is a short open bottom cylindrical member securely attached to the under surface of the boom collar 53 coaxially of the shaft 55 and having a bottom flange surface 75. The block 74 has a bore slidably receiving the axial shaft 55, a cylindrical surface 76 having a plunger fit within the open bore of the cap 73 and is removably attached to the closure 66 as by a bolt 77. The upper surface of the closure 66 has a raised hub area 78 for mounting the block 74. Radially adjacent the hub area 78 is an accurately machined flange surface 79 intended for abutting contact with the cap flange surface 75.

The block 74 may be of a resilient material, such as neoprene rubber, to cushion the impact of the raised cylinder 65 against the boom collar 53. Alternatively, the upper surface of the block 74 may be relieved as indicated at 80 to provide an "air" cushion at the upper limit of cylinder movement.

The closure member 66 also has a series of, preferably four, peripheral ear flanges 82 adapted for attachment of the upper ends of a series of strengthening rods 83. The lower end of each rod 83 is attached to similar ear flanges 84 on the periphery of the lower closure member 67 (see FIG. 7).

One side of the closure member 66 is also provided with a radial or flange extension 85. The extension 85 is preferably on the side toward the boom 30 and has a bore slidably receiving a stabilizer rod 86 (described in detail below), provides a stop surface for an electrical switch actuating rod 87, and preferably provides interior conduits and a fitting 88 for pneumatic pressure fluid, such as compressed air from a suitable source (not shown), to be carried through piping conduit 89 to the lower end of cylinder 65. As described in detail below, the pressure fluid carried through conduit 89 controls the expansion of the mandrel band engaging elements.

Referring to FIG. 8, the closure 67 seals the lower end of cylinder 65 and is secured thereon by the series of strengthening rods 83 attached to the peripheral flanges 84, all as described above. The closure 67 is also provided with suitable interior conduits 91 extending from within the cylinder 65 and above the closure to a fitting 92 connected to the lower end of piping conduit 89.

Referring also to FIG. 6, extending axially through the lower closure 67 is a short cylindrical shaft 95. The shaft 95 is movable in a slide bushing 96 provided with suitable circumferential sealing means such as the O-ring indicated at 97. The upper end of shaft 95 carries a flange-like fixed piston 98 having suitable peripheral sealing means such as the O-ring indicated at 99. The lower end of shaft 95 carries a segment actuating spider or plate indicated generally at 100. The plate 100 has an upper hub surface 101 intended for abutting contact with the under surface 102 of the closure 67.

Pressure fluid introduced into the lower end of cylinder 65 through conduit 89 and fitting 92 will impinge on the piston 98, against the resistance of fixed closure 67, to raise the shaft 95 upwardly within cylinder 65 until the plate 100 contacts closure surface 102. When the piston 98 is raised, air entrapped within cylinder 65 below the shaft piston 58, will exhaust through the hollow bore of shaft 95. The length of shaft 95 and the position of plate 100 thereon establishes the range of radial expansion of the mandrel 31 band engaging elements.

The mandrel 31 grips or engages the inner surfaces of an uncured tire band B by radially expansible elements indicated generally at 105. As shown, the elements 105 comprise a series of four arcuate-in-cross-section segments. The lower end of each segment 105 is preferably provided with an inwardly tapered nose cone 106 to facilitate entry of the mandrel 31 into a tire band B. The retracted diameter of the segments 105 is less than the bead diameter of the bands B. When expanded, the diameter of the segments is greater than the bead diameter.

Referring to FIG. 6, the segments 105 are moved simultaneously from the retracted (full line) to the expanded (chain line) position by raising the actuating spider 100. The spider 100 is connected to the segments by an expanding linkage which works against a fixed spider or plate indicated generally at 110.

Referring to FIG. 9, each segment 105 is connected to the fixed spider 110 by a link element 111 having bifurcated ends. The upper end of each link element 111 is movably connected over an ear flange 112 on the spider 110 by a pivot pin 113. The lower end of each link element is movably connected between a pair of inwardly projecting stud flanges 114, as by a pivot pin 115.

Referring to FIG. 10, each segment 105 is connected to the actuating spider 100 by a link element 116, having bifurcated ends similar to the link elements 111. The lower end of each link element 116 is movably connected over an ear flange 117 on the spider 100 by a pivot pin 118. The upper end of each link element is movably connected between the stud flanges 114 by the pivot pin 115.

Referring again to FIG. 6, above the fixed spider 110 is a stabilizing spider indicated generally at 120. Each segment 105 is connected to the spider 120 by a link element 121. The upper end of each link element 121 is attached as by a pin 122 to an ear flange 123 on the spider 120. The lower end of each link element is attached as by a pin 124 to a suitable flange 125 on each segment 105.

As described above, a stabilizer rod 86 is slidably received in a bore extending vertically through the extension 85 of the upper cylinder closure 66. Referring to FIG. 6, the upper end of the stabilizer rod 86 extends through the boom collar 53 and is attached thereto as indicated at 126. Below the upper closure 66, a stabilizing flange 127 is securely attached to the outer wall of cylinder 65. The lower portion of the stabilizer rod 86 is slidably received in a bore extending vertically through one side of the flange 127. It is preferred that the mandrel 31 be provided with the stabilizing rod 86 so that the mandrel will not rotate around the axial shaft 55. Such stabilization is particularly important when the mandrel is in the "down" or lowered position (FIG. 2).

Referring again to FIG. 6, an electrical switch 128, similar to switches 50 described above, is mounted on a bracket 129 atop the boom collar 53. The switch 128 is actuated as by a linkage (shown in chain lines) indicated at 130 and operatively connected in a suitable manner to the segment actuating spider 100. As further described below, switch 128 controls the loading mechanism with the mandrel 31 in the expanded or band engaging condition.

Another electrical switch 132 is also mounted atop boom collar 53. Switch 132 is preferably of the lever action type having a two position interior mechanism which is actuated by the switch rod 87 (described above). As further described below, switch 132 is actuated in the first position when a collar 133 on the switch rod 87 is contacted by the upper surface of the flange extension 85 of the upper cylinder closure 66. Switch 132 is actuated in the second position when a collar 134 is contacted by the under surface of the flange 85. The first position of switch 132 controls the loading mechanism with the mandrel 31 in the raised position. The second position of switch 132 controls the loading mechanism with the mandrel 31 in the position aligned axially with a lower mold section 21.

*The Loading Platform*

In the preferred form of the invention, each loading platform 32 for supporting uncured tire band B on a vertical axis is a component of a mechanism, including a boom 30 and a mandrel 31, for serving one mold, comprising an upper and a lower mold section. As best shown in FIGS. 4 and 5, each platform 32 has a cantilever support bracket 135 extending outwardly in front of the press from the base 22. The press end of the bracket 135 is provided with a yoke end 136 which engages a suitable stud member 137 on the press base. The bracket 135 is removably attached to the press as by suitable mounting pins 138.

The outer end of bracket 135 has a boss 139 with a vertical bore therethrough for mounting the band platform 140. The band platform 140 has a series of, preferably four, spoke arms 141 extending radially from a hub portion 142. The outer end of each spoke arm 141 is provided with an elongated radial slot 143 for adjustable attachment of the band supports 145. The band supports 145 are adjustable radially of the hub 142 to enable the platform 32 to support uncured tire bands B having different bead or outside diameters. It is preferred that the upper end of each support 145 be provided with flange ends, such as shown, as will carry the uncured bands without injury to the ends thereof. It is also preferred that the platform 140 be stabilized to prevent rotation thereof by suitable strap brackets 146 extending between the hub portion 142 and the yoke ends of the bracket 135.

The bolt assembly 147, which attaches the platform 140 to the outer end of bracket 135 is provided with a coiled spring 148 to maintain the platform in a slightly elevated position when there is no uncured tire band B thereon. When a band B has been placed on the supports 145, the resistance of spring 148 will be overcome and the platform 140 will lower to rest on the bracket 135. This movement will cause a striker lug 149 to actuate an electrical switch 150, similar to switches 50 described above. As further described, switch 150 controls the reciprocating movement of the mandrel 31.

*Operation of the Loading Mechanism*

FIG. 1 depicts the loading mechanism of the invention at the beginning of an operational cycle with the mandrel segments contracted and the press closed for shaping and curing a previously loading and positioned band B. These steps have been taken—

(a) The boom 30 has been rotated to the front of the press by retraction of the rod of cylinder 43. When the boom 30 is correctly in this position, electrical switch 50B is actuated (see also FIG. 4).

(b) The mandrel 31 has been raised by the introduction of pressure fluid into cylinder 65 above the fixed piston 58. When the mandrel 31 is correctly in this position, electrical switch 132 is actuated in the first position (see also FIG. 6).

(c) An uncured tire band B is supported on a vertical axis by platform 32. When a tire band is correctly in this position, electrical switch 150 is actuated (see also FIG. 10).

FIG. 2 depicts the loading mechanism during the next phase of the operational cycle. The electrical switches (50B, 132, and 150) have each signalled that their respective elements are correctly in position. Suitable electrical master controllers and valve control means (not shown) then react, either after a brief delay or instantly, as may be required by the operation of the particular press involved to initiate these steps—

(d) The mandrel 31 will be lowered by the exhaustion of pressure fluid from cylinder 65 above the fixed piston 58.

(e) The mandrel segments 105 will be expanded by the introduction of pressure fluid into cylinder 65 below the movable piston 98. When the mandrel segments are correctly in this position, electrical switch 128 is actuated.

FIG. 3 depicts the loading mechanism during the next phase of the operational cycle. The cure cycle has been completed, the press opened and the cured tire ejected and removed by suitable means (not shown) actuated by the master controller. Actuation of switch 128 has signalled that the mandrel 31 is engaging the band B. The master controller then initiates these steps—

(f) The mandrel 31 will be raised, as in operational step (b) described above.

(g) The boom 30 will be rotated into the press by extension of the rod of cylinder 43. When the boom 30 is correctly in position aligned axially with the lower mold 21, electrical switch 50A is actuated (see also FIG. 4). If desired, the movement of boom 30 away from switch 50B could be used to energize switch 132 for second position actuation.

(h) After the boom 30 is in correct position, the mandrel 31 will be partially lowered, as in operational step (d) described above, but only to a predetermined position just above the forming mechanism or the lower mold section, depending upon the type of press. When the mandrel 31 is correctly in the partially lowered position, electrical switch 132 is actuated in the second position (see also FIG. 6) stopping the lowering motion of the mandrel and permitting the mandrel segments 105 to contract by the exhaustion of pressure fluid from cylinder 65 below the movable piston 98 bringing the band into contact with the uppermost element of the band forming mechanism.

The last phase of the operational cycle of the loading mechanism is the return to the FIG. 1 condition. After a brief delay to assure unloading of the uncured band B from the mandrel 31, which unloading may be checked by a suitable electrical switch (not shown) mounted adjacent the lower mold section 21, the mandrel 31 is raised, as in operational step (b) described above, and the boom 30 is rotated to the front of the press, as in operational step (a) described above.

Forming Mechanism

As shown in FIG. 3, the forming mechanism indicated generally at 160 includes an upper plate 161 which clamps the upper end of the now conventional curing bag 162 of the type shown in the inventor's prior Patent No. 2,808,618. The loading mandrel 31 may be used, if desired, to facilitate removal and replacement of the forming mechanism 160 from the press.

Referring to FIG. 6, the lower ends of the link elements 116 may be extended beyond the pivot pins 118 and provided with suitable angular notches 163 adapted to engage beneath a suitable adapter 161A fitted around the upper plate 161 and lift the forming mechanism 160 out of the press. During this special operation, the master electrical controller blocks out the "automatic" operations described above, the expansion and contraction of the segment link elements, the raising and lowering of the mandrel 31 and the rotation of the boom 30 are individually controlled.

SUMMARY

A novel concept of a mechanism for the automatic loading of presses for shaping and curing unvulcanized tire bands has been shown and described. Various modifications could be made therein, particularly with respect to the configuration of the mandrel band engaging elements 105, the various electrical switches, controllers and valve means, and the coordination of the operational cycle with various tire ejecting means, post inflation apparatus, conveyor, etc. Therefore, for these and other reasons as will be apparent, the true scope of the invention will be determined by the scope of the appended claims.

What is claimed is:

1. In a tire press for shaping and curing unvulcanized tire bands within separable upper and lower mold sections and having a boom thereon, said boom being rotatable on a vertical axis so that a collar thereon may be aligned axially with a lower mold section, a reciprocating tire band mandrel having radially expansible segments, comprising, a cylinder having end closures, a stationary shaft depending from said boom collar and extending into said cylinder through one of said end closures, a movable shaft extending into said cylinder through the other of said end closures, individual piston means on the end of each shaft and engaging said cylinder, link means connecting said segments with said movable shaft and said cylinder, and means to introduce pressure fluids into said cylinder between each said piston means and an adjacent end closure.

2. Operating mechanism for a reciprocating tire band mandrel having radially expansible segments, comprising, a cylinder having end closures, a stationary shaft extending into said cylinder through one of said end closures, a movable shaft extending into said cylinder through the other of said end closures, individual piston means on the end of each shaft and engaging said cylinder, link means connecting said segments with said movable shaft and said cylinder, and means to introduce pressure fluids into said cylinder between each said piston means and an adjacent end closure.

3. Operating mechanism for a reciprocating tire band mandrel having radially expansible segments, comprising, a cylinder having end closures, a stationary shaft extending into said cylinder through one of said end closures, a movable shaft extending into said cylinder through the other of said end closures, individual piston means on the end of each shaft and engaging said cylinder, link means connecting said segments with said movable shaft and said cylinder, means to introduce pressure fluid into said cylinder between the piston means on said stationary shaft and the nearest end closure thereby reciprocating said mandrel on said stationary shaft, and additional means to introduce pressure fluid into said cylinder between the piston means on said movable shaft and the nearest end closure thereby expanding said segments.

4. A reciprocating tire band mandrel having radially expansible elements, comprising, a boom, a shaft depending from said broom, a fixed piston on the end of said shaft, a cylinder coaxial of said shaft and engaging said fixed piston, an upper cylinder closure slidably receiving said shaft, a movable piston within said cylinder below said fixed piston, a piston shaft depending from said movable piston, a lower cylinder closure slidably receiving said piston shaft, a plate on the end of said piston shaft below said lower closure, link means connecting said radially expansible elements with said cylinder and said plate, means to introduce pressure fluid into said cylinder between said fixed piston and said upper closure thereby reciprocating said cylinder on said depending shaft, and additional means to introduce pressure fluid into said cylinder between said movable piston and said lower closure thereby raising said plate and expanding said elements.

5. A reciprocating tire band mandrel having radially expansible elements, comprising, a boom, a hollow shaft depending from said boom, means to seal the lower end of said hollow shaft, a fixed piston on said shaft above said sealed end, a cylinder coaxial of said hollow shaft and engaging said fixed piston, an upper cylinder closure slidably receiving said hollow shaft, a movable piston within said cylinder below said fixed piston, a piston shaft depending from said movable piston, a lower cylinder closure slidably receiving said piston shaft, a plate on the end of said piston shaft below said lower closure, link means connecting said radially expansible elements with said cylinder and said plate, means to introduce pressure fluid through said hollow shaft into said cylinder between said fixed piston and said upper closure thereby reciprocating said cylinder on said hollow shaft, and additional means to introduce pressure fluid into said cylinder between said movable piston and said lower closure thereby raising said plate and expanding said elements.

6. In a tire press for shaping and curing unvulcanized tire bands within separable upper and lower mold sections and having a boom thereon, said boom being rotatable on a vertical axis so that a collar thereon may be aligned axially with a lower mold section, a reciprocating tire band mandrel having radially expansible segments, comprising, a cylinder having end closures, a stationary shaft depending from said boom collar and extending into said cylinder through one of said end closures, a movable shaft extending into said cylinder through the other of said end closures, individual piston means on the end of each shaft and engaging said cylinder, link means connecting said segments with said movable shaft and said cylinder, and means to introduce pressure fluids into said cylinder between each said piston means and an adjacent end closure, and a platform on the front of said press for supporting a tire band on a vertical axis for selective engagement by said mandrel segments.

References Cited in the file of this patent

UNITED STATES PATENTS

| | | |
|---|---|---|
| 1,211,611 | Meyer et al. | Jan. 9, 1917 |
| 1,836,444 | Carnahan | Dec. 15, 1931 |
| 2,318,310 | Heintz | May 4, 1943 |
| 2,807,125 | George | Sept 24, 1957 |
| 2,907,600 | Lowery | Oct. 6, 1959 |

FOREIGN PATENTS

| | | |
|---|---|---|
| 595,335 | Great Britain | Dec. 2, 1947 |